Figure 1:
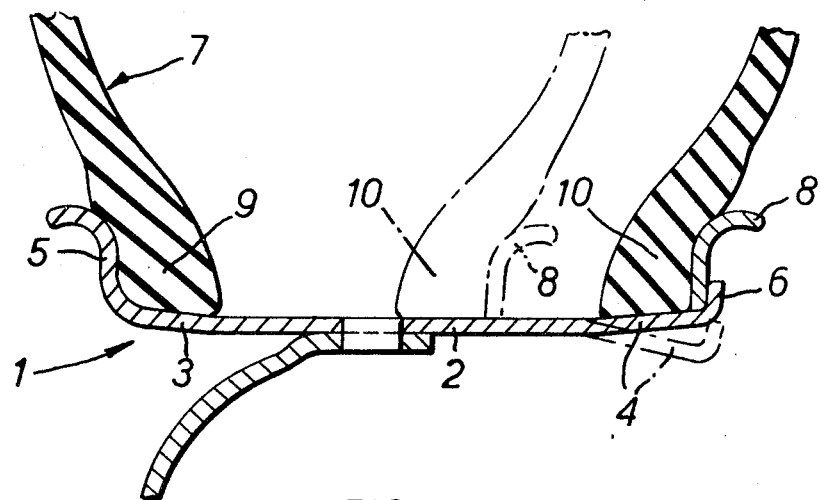

United States Patent
Mitchell

[15] 3,639,964
[45] Feb. 8, 1972

[54] METHOD OF MOUNTING A PNEUMATIC TIRE ON A DEFORMABLE RIM

[72] Inventor: William Eric Mitchell, Coventry, England
[73] Assignee: The Dunlop Company Limited, Erdington, Birmingham, England
[22] Filed: Mar. 12, 1969
[21] Appl. No.: 806,658

[30] Foreign Application Priority Data
    Mar. 21, 1968   Great Britain.....................13,682/68

[52] U.S. Cl..............................29/159.01, 29/512, 152/405
[51] Int. Cl. ........................................B21h 1/02, B21k 1/32
[58] Field of Search...............29/159.01, 512; 152/330, 405

[56] References Cited
UNITED STATES PATENTS
1,961,095   5/1934   Baker et al..............................152/405
2,261,465  11/1941   Grange et al. .......................29/159.01
2,409,901  10/1946   Russell...................................152/405

FOREIGN PATENTS OR APPLICATIONS
1,149,739  12/1957   France..................................152/330

*Primary Examiner*—Charlie T. Moon
*Attorney*—Jeffers and Young

[57] ABSTRACT

A method of mounting a tire on a wheel rim having an inwardly depressed bead seat and a detachable flange comprising arranging the tire on the rim and then expanding the bead seat to hold the tire and the detachable flange permanently in position.

5 Claims, 2 Drawing Figures

METHOD OF MOUNTING A PNEUMATIC TIRE ON A DEFORMABLE RIM

This invention relates to vehicle wheels and is an improvement in or modification of the invention described in the specification of our copending British Patent application No. 34,476/65.

According to one embodiment of the invention described in the specification of application No. 34,476/65 one flange and the adjacent portion of a flat-base wheel rim is depressed radially inwardly to permit the beads of a pneumatic tire to pass over the depressed flange. A pneumatic tire is mounted on the rim, and the depressed flange and the adjacent region of the rim are then expanded to the required diameter to provide a bead seat to engage the associated bead of the tire.

One disadvantage of this method is that the rim flange is an integral part of the rim and since the flange extends in a generally radial direction it may be distorted by the expansion process.

According to one aspect of the invention, a method for mounting a pneumatic tire on a metal rim having a base portion and first and second side portions, the first side portion being arranged to be associated with a separate flange component, the said first side portion having a radially outwardly extending lip formed thereon and being depressed radially inwardly to permit the beads of a pneumatic tire to pass over the lip, the said method comprises arranging a pneumatic tire on the rim together with the separate flange component and subsequently deforming the said first side portion of the rim to be engageable with an associated bead of the tire to lock the separate flange component in position between the lip and the tire.

According to another aspect of the invention a partly formed rim, for incorporation in a pneumatic tire and rim assembly, comprises a rim base portion having a radially outwardly extending lip of small radial height formed on each side portion, one side portion being depressed radially inwardly to permit the beads of a pneumatic tire to pass over the lip and being expansible to engage a bead of a tire mounted on the rim and to lock a separate flange component in position between each lip and the tire.

According to a further aspect of the invention a pneumatic tire and wheel assembly comprises a pneumatic tire mounted on a rim and secured thereon by two flange components each permanently locked in position respectively between one bead of the tire and a radially outwardly projecting lip of small radial height formed on the associated side of the rim.

One or both rim flanges may be separate from the rim body.

The separate flanges may in a preferred construction be bonded to the beads of an associated tire, but in an alternative construction the flanges may be fitted to the assembly separately from the tire.

Figure 2:
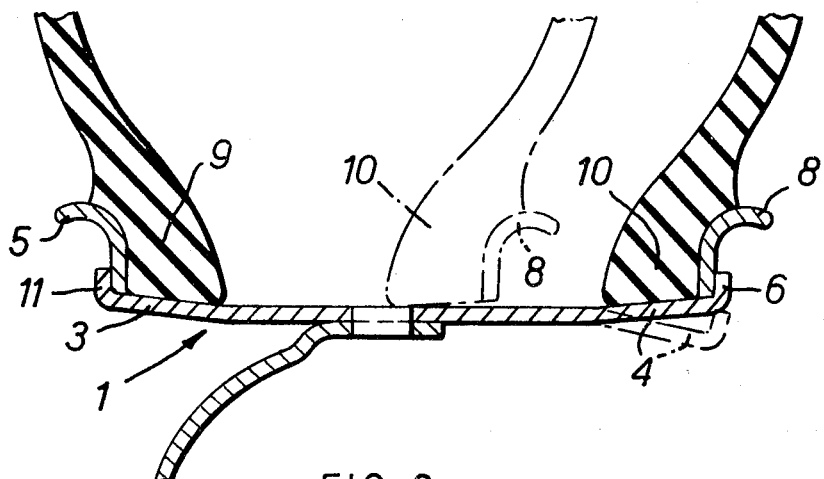

Two embodiments of the invention will now be described by way of example with reference to the accompanying drawings in which:

FIG. 1 is a diagrammatic axial cross-sectional view of a portion of a wheel for a tire and wheel assembly according to the invention, and FIG. 2 is a diagrammatic axial cross-sectional view of a portion of an alternative tire and wheel assembly according to the invention.

In one embodiment of the invention as shown in FIG. 1 a partly formed rim 1 formed without an inwardly depressed well comprises a base portion 2 and two side portions 3,4. One side portion 3 is turned radially outwardly to provide a bead-retaining flange 5 formed integrally therewith and the other side portion 4 is turned radially outwardly to provide a lip 6.

The side portion 4 is depressed radially inwardly to permit the beads of a pneumatic tire 7 to pass over the lip 6, and a separate flange component 8 is provided for association with the side portion 4.

A method of mounting a pneumatic tire on the rim will now be described.

A pneumatic tire 7 and the separate flange component 8 are arranged on the partly formed rim with one tire bead 9 in contact with the flange 5 and the other tire bead 10 and the flange component 8 held in the position as shown in dotted lines. The depressed portion 4 of the rim is then expanded radially outwardly and the tire bead 10 and the flange component 8 released so that the separate flange 8 is moved into a position in which it is locked between the lip 6 and the tire bead 10.

In a second embodiment as shown in FIG. 2 both side portions 3,4 are formed with radially outwardly extending lips 6,11 and two separate flange components 5,8 are provided for association respectively with the two side portions 3,4 of the rim. The flange components 5,8 are bonded respectively to the tire beads 9,10 before arranging the tire on the rim. Expansion of the depressed portion 4 then enables each flange component to be held tightly in position between the associated lip and tire bead.

A vehicle wheel having a rim as described above, provides a permanent mounting for a pneumatic tire which eliminates the need for an inwardly depressed well-base portion in the rim and thus provides greater space within the rim for mounting an associated brake.

The fact that only the depressed lip and adjacent portion is expanded means that there can be no distortion of the associated flange due to the expansion process. An additional advantage is that the lip is of small radial height and consequently the peripheral portion need be depressed, to allow mounting of a tire, to a smaller extent than in a tire according to the invention described in the specification of application No. 34,476/65 in which the flange is an integral part of the rim.

I claim:

1. A method for mounting a circumferentially inextensible pneumatic tire on a deformable rim having a substantially cylindrical base portion and laterally spaced radially outwardly extending first and second side portions, said first side portion having operatively associated therewith a radially outwardly bent lip which is initially disposed radially inwardly of said base portion, the steps comprising: passing the beads of the pneumatic tire over the lip in its initial radially inward position relative to said base portion to dispose the tire within the radial confines defined by the laterally spaced-apart side portions, and subsequently expanding radially outwardly said bent lip of said first side portion of the rim to a position wherein said first side portion is operatively engageable by an associated bead of said tire to effect a locking of the tire bead on the rim.

2. A method according to claim 1 including bonding a separate flange component to each side of said tire prior to mounting of said tire on said rim.

3. The method according to claim 2 including the step of: locking said flange components associated with the sides of the pneumatic tire in position between the associated lips at the first and second side portions of said metal rim and said tire as said first side portion of the rim is expanded radially outwardly.

4. The method according to claim 1 including the step of: bonding at least one flange component directly to the tire prior to mounting said tire on said rim.

5. The method according to claim 1 wherein a flange component is disposed between the tire side and the associated wheel lip.

* * * * *